United States Patent
Kuo

(10) Patent No.: US 7,289,108 B2
(45) Date of Patent: Oct. 30, 2007

(54) METHOD FOR CONSTITUTING BOOTSTRAP HOTKEYS AND INPUT SYSTEM THEREOF

(75) Inventor: John Kuo, Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 516 days.

(21) Appl. No.: 10/680,646

(22) Filed: Oct. 7, 2003

(65) Prior Publication Data

US 2004/0193868 A1    Sep. 30, 2004

(30) Foreign Application Priority Data

Mar. 28, 2003   (TW) .............................. 92107176 A

(51) Int. Cl.
 *G06F 3/02*    (2006.01)
 *G09G 5/00*    (2006.01)

(52) U.S. Cl. ........................... 345/172; 710/10; 341/22

(58) Field of Classification Search ........ 345/168–172; 341/20–22; 710/10
See application file for complete search history.

(56) References Cited

U.S. PATENT DOCUMENTS

| | | | | |
|---|---|---|---|---|
| 5,936,614 | A * | 8/1999 | An et al. ..................... | 345/173 |
| 7,006,014 | B1 * | 2/2006 | Henty ......................... | 341/22 |
| 2003/0067446 | A1 * | 4/2003 | Ono et al. .................. | 345/172 |
| 2004/0036632 | A1 * | 2/2004 | Ford ........................... | 341/22 |
| 2004/0113892 | A1 * | 6/2004 | Mears et al. ................ | 345/172 |

FOREIGN PATENT DOCUMENTS

| | | | |
|---|---|---|---|
| TW | 468109 | A2 | 12/2001 |
| TW | 485315 | A1 | 5/2002 |

* cited by examiner

*Primary Examiner*—Amr A. Awad
*Assistant Examiner*—Michael Pervan
(74) *Attorney, Agent, or Firm*—Rosenberg, Klein & Lee

(57) ABSTRACT

A method for constituting bootstrap hotkeys comprises a step (11) for identifying a predetermined keyboard and a step (13) for booting hotkey functions. The step (11) further comprises: a step (110) for executing hotkey's bootstrap codes and transferring a keyboard-identification means to a keyboard when a computer is booted; a step (112) for transmitting a keyboard-confirmation means from the keyboard to the host computer in response to the keyboard-identification means; and a step (114) for recognizing the keyboard-confirmation means in light of the hotkey's bootstrap codes; followed by the activation of the hotkey function or, if fails, by terminating the hotkey's bootstrap codes. The step (13) further comprises: a step (130) for validating a depressed single key or combination key of the keyboard by the hotkey's bootstrap codes; if confirmed to be a bootstrap hotkey, a menu of hotkey functions is shown on a screen; and a step (132) for comparing a depressed single key or combination key of the keyboard with a input-key indicating portion; if identical, the host computer will execute an application program corresponding to the application indicating portion.

23 Claims, 3 Drawing Sheets

METHOD FOR CONSTITUTING BOOTSTRAP HOTKEYS AND INPUT SYSTEM THEREOF

FIELD OF THE INVENTION

The present invention relates in general to the hotkeys on a computer keyboard and, in particular, to a method for constituting bootstrap hotkeys on a predetermined keyboard.

BACKGROUND OF THE INVENTION

Taiwanese Patent Application Publication No. 485315 has disclosed a method in which popup icons prompts system messages with the following steps: intercepting a computer's system event; mapping the system event to a hotkey; treating the hotkey through the system BIOS; executing the hotkey's driver under Windows; and showing a popup icon corresponding to the system event on a display. The above approach, therefore, is limited to computers with BIOS systems and constrains its usage. A defect couldn't be overlooked.

Another Taiwanese Patent Application Publication No. 468109 discloses the hotkey defining system in which hotkeys are booted and operated simultaneously with Windows Operating System. This hotkey defining system comprises: an inputting module for receiving inputs from a pointing device or a keyboard; a booting module for enabling and opening a user's interface according to a control key of the keyboard, in which the user's interface is provided with a plurality of input selections corresponding to respective function keys of the keyboard; a defining module for opening a defined interface corresponding to a function key so as to build connection with a designated application program when an input selection is made by the pointing device, or directly build the connection with a shortcut when the pointing device is clicked and pulled to establish the shortcut to the input selection; and an executing module for opening or executing designated corresponding application program or shortcut based on the connections built by the defining module as soon as one of the function keys on the keyboard is depressed. Therefore, this hotkey system cannot function with only a single input devise such as a keyboard. A pointing input device requires a single input devise for proper hotkey functions. Thus, it poses a constraint for such hotkey system.

For most people, expansion of hotkey function is achieved by adding more hotkeys on a keyboard, resulting in cost increases for both hardwares and softwares. Thus, the present invention of constituting bootstrap hotkeys and its input system has an advantage of expanding hotkey function without being constrained by any system or increasing in cost.

SUMMARY OF THE INVENTION

An object of the present invention is to provide a method for predetermining a keyboard, followed by constituting bootstrap hotkeys.

Another object of the present invention is to provide a method of setting up functional hotkeys on a predetermined keyboard without the cooperation of an input pointing device.

In order to realize foregoing objects, the method of this invention for constituting bootstrap hotkeys comprises a step of identifying a predetermined keyboard and a step of booting hotkey functions. The step of identifying a keyboard is further comprised steps of: a step for hotkey's bootstrap codes to transfer a keyboard-identification means to a keyboard connected with a computer at the first time when the computer is booted to execute the hotkey's bootstrap codes; a step for the keyboard to response a keyboard-confirmation means, based on the keyboard-identification means, to the computer; and a step for the hotkey's bootstrap codes to decide whether the keyboard-confirmation means is correct or not; go further to boot hotkey functions if active, or cease executing the hotkey's bootstrap codes, otherwise. The step of booting hotkey functions is further comprised steps of: a step for the hotkey's bootstrap codes to decide whether a depressed single key or combination key of the keyboard is a bootstrap hotkey or not; if active, go to show on the computer a menu of hotkey functions including at least an input-key indicating portion and an application indicating portion corresponding to the input-key indicating portion; and a step for the hotkey's bootstrap codes to decide whether or not a depressed single key or combination key of the keyboard is identical to that indicated by the input-key indicating portion; if active, the computer is supposed to execute an application program indicated by the application indicating portion corresponding to the input-key indicating portion.

Furthermore, this invention also provides an input system comprising: hotkey's bootstrap codes for transferring a keyboard-identification means to a keyboard connected with a computer at the first time when the computer is booted to execute the hotkey's bootstrap codes; a keyboard for responding a keyboard-confirmation means according to the keyboard-identification means, in which the hotkey's bootstrap codes will decide whether the keyboard-confirmation means is correct or not; then boot the hotkey functions if active, or cease execution of the hotkey's bootstrap codes, otherwise; a menu of hotkey functions to be shown on a computer's screen when a depressed single or combination key of the keyboard is decided as a bootstrap hotkey by the hotkey's bootstrap codes, in which the menu of hotkey functions comprises at least an input-key indicating portion and a corresponding application indicating portion; whereby, the computer will perform an application program of the application indicating portion corresponding to the input-key indicating portion when the hotkey's bootstrap codes confirms that an input single or combination key of the keyboard is identical to that indicated by the input-key indicating portion.

For more detailed information regarding advantages or features of this invention, at least an example of preferred embodiment will be described below with reference to the annexed drawings.

BRIEF DESCRIPTION OF THE DRAWINGS

The above objects and advantages of the present invention will become more apparent with reference to the appended drawings wherein.

DETAILED DESCRIPTION OF THE INVENTION

Figure 1:
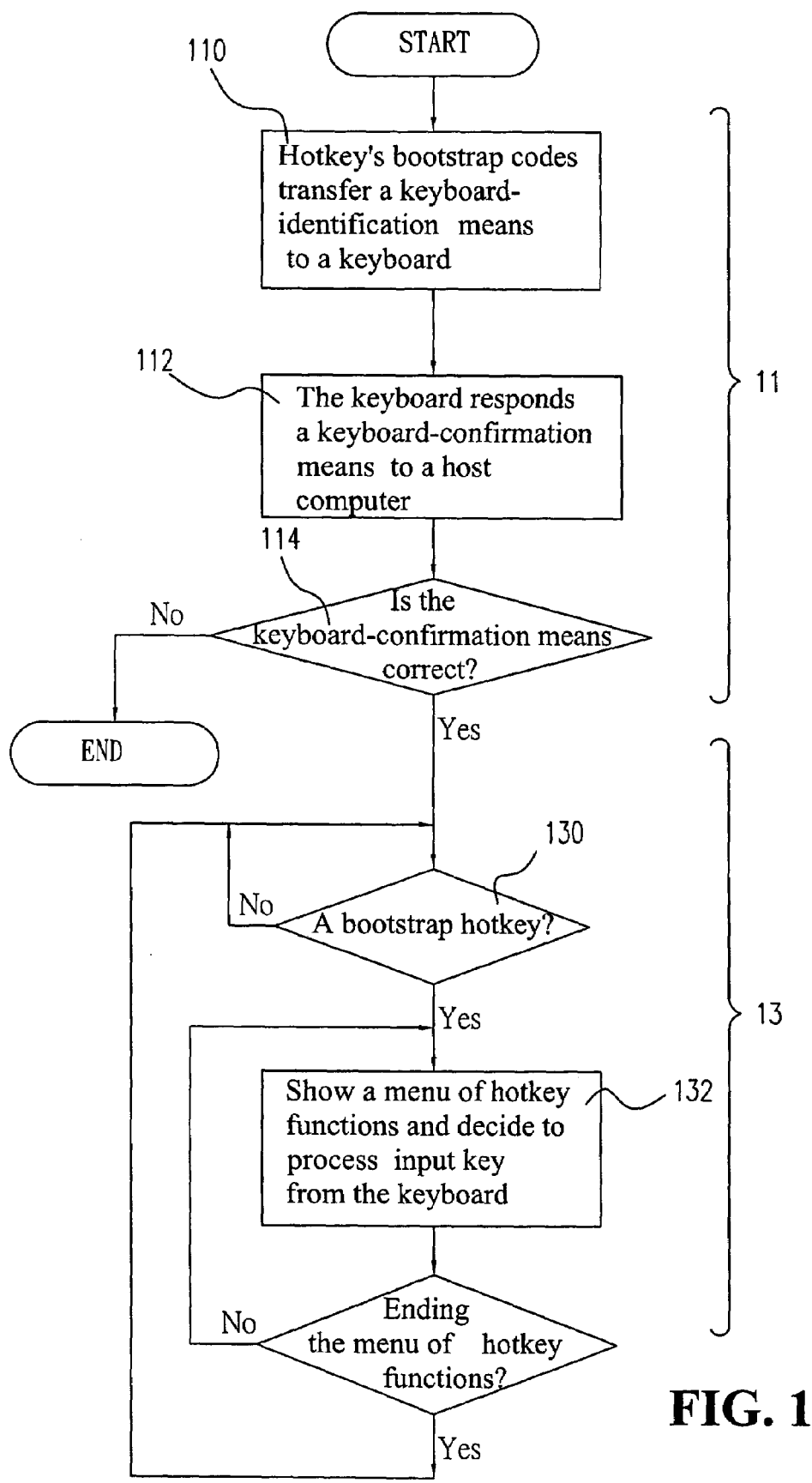
FIG. 1 is a flow chart of the method of the present invention.

FIG. 1 shows the flow chart of the method of the present invention. As shown in FIG. 1, a method of this invention for constituting bootstrap hotkeys mainly comprises a step (11) and a step (13), in which this invention is characterized in identifying a predetermined keyboard by performing the step (11) and booting hotkey functions by performing the step (13), that is, a keyboard could be identified by running step (110) through step (114) included in the step (11), then, booting hotkey functions by the step (13) becomes possible.

In the step (110), hotkey's bootstrap codes 40 is supposed to transfer a keyboard-identification means 50a to a keyboard 30 connected with a host computer 20 at the first time when the host computer 20 is booted to execute the hotkey's bootstrap codes 40. Now, suppose the hotkey's bootstrap codes 40 has transferred to the keyboard 30 a keyboard-identification means 50a, a train of data led by "E4" for example, then the host computer 20 will expect the keyboard 30 for a due response to a keyboard-identification means 50a led by "E4". The step (112) is a step for the keyboard 30 to response a keyboard-confirmation means 50b, led by "E4" for example and based on the keyboard-identification means 50a, to the host computer 20. During this step (112), in the event the keyboard 30 has failed to response with the keyboard-confirmation means 50b correctly within a predetermined period of time, for example 5 seconds, and then the keyboard 30 would be considered incompatible with this invention and rejected. The step (114) is a step for the hotkey's bootstrap codes 40 to decide whether the keyboard-confirmation means 50b is correct or not; go further to boot hotkey functions if active, or cease executing the hotkey's bootstrap codes 40, otherwise. As described in foregoing example, in case the keyboard-confirmation means 50b responded by the keyboard 30 is led by "E4", it means a successful identification of the keyboard 30, and then executing of the step (13) for booting hotkey function is permitted. Furthermore, the keyboard-identification means 50a and keyboard-confirmation means 50b could be practically embodied in form of computer instructions, such as keyboard-identification instructions and keyboard-confirmation instructions.

Since the method of this invention will identify the keyboard 30 coupled with the host computer 20 during the step (11) for identifying a designated keyboard, therefore, a keyboard supplier who uses the method of this invention is benefited in protecting his own value-added programs of keyboard and accordingly his intellectual properties, for example, a hotkey-functions possessed keyboard driver or TSR (terminate-and-stay-resident program), etc.

The step (13)—a step of booting hotkey functions—comprises step (130) through step (132) to provide human-computer interaction for operating the host computer 20 by booting keyboard's hotkeys, without needing any aid from a pointing device (a mouse, for example). The step (130) is a step for the hotkey's bootstrap codes 40 to decide whether a depressed single key or combination key of the keyboard 30 is a bootstrap hotkey 50c or not; if active, go to show on the host computer 20 a menu of hotkey functions 60 including at least an input-key indicating portion 60a and an application indicating portion 60b corresponding to the input-key indicating portion 60a. Processing a practical instance for the bootstrap hotkey 50c by depressing a single key F12 or a combination key Ctrl-A during the step (130), at this time, no sooner has the hotkey's bootstrap codes 40 decided that the input key F12 or the combination key Ctrl-A is a bootstrap hotkey 50c of this invention, the menu of hotkey functions 60 is presented on the screen of the host computer 20 to show the input-key indicating portion 60a providing instructions for operating keys or combination keys on the keyboard 30 as well as the corresponding application programs in the application indicating portion 60b.

The step (132) is a step for the hotkey's bootstrap codes 40 to decide whether or not a depressed single key or combination key of the keyboard 30 is identical to that indicated by the input-key indicating portion 60a; if active, the host computer 20 is supposed to execute an application program assigned by the application indicating portion 60b corresponding to the input-key indicating portion 60a. Hence, a user of the host computer 20 is supposed to depress a single key or combination key of the keyboard 30 shown in the input-key indicating portion 60a according to a menu of hotkey functions 60, so that a corresponding application program of the application indicating portion 60b could be performed.

Figure 2:
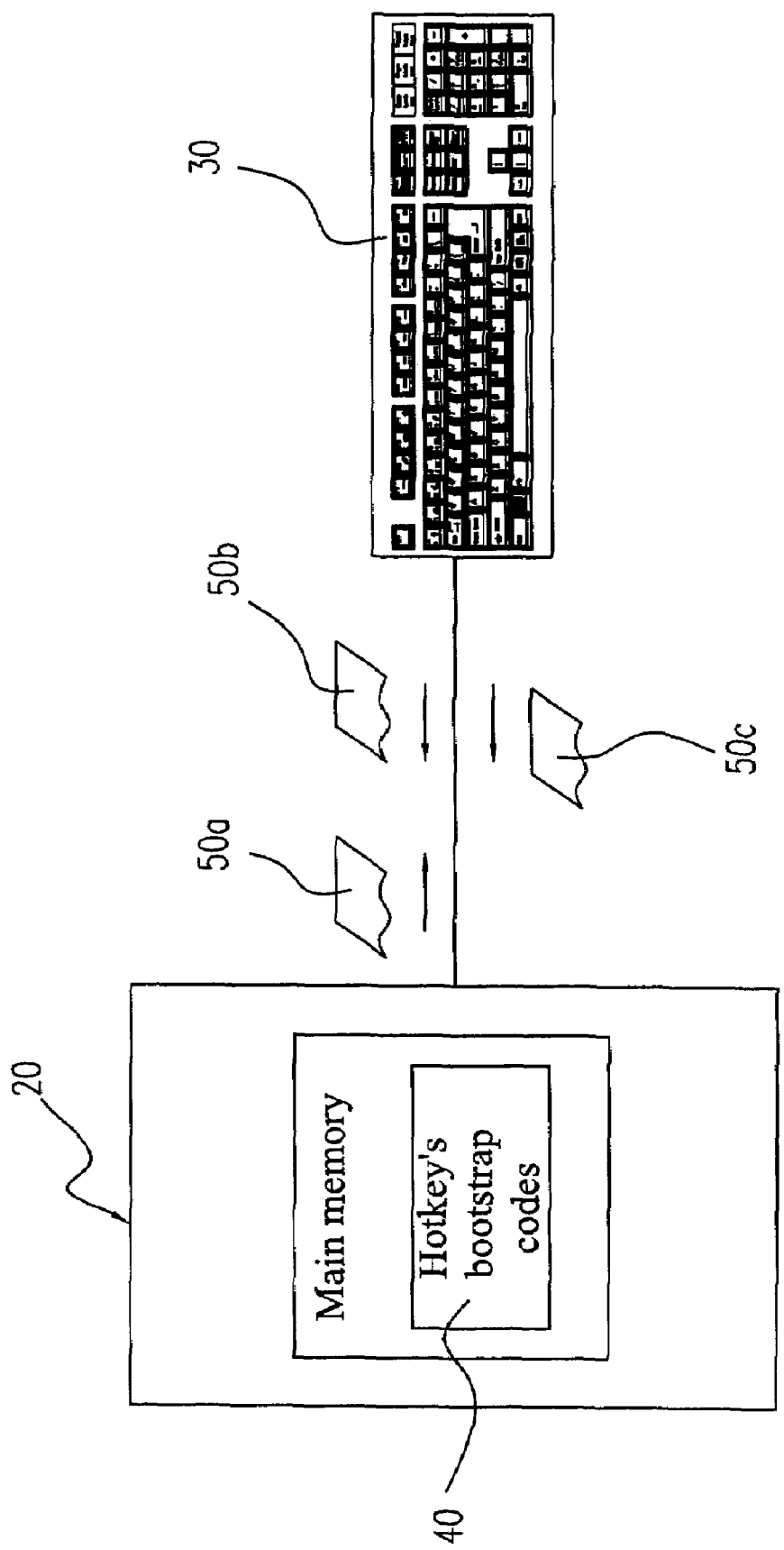
FIG. 2 is an illustration of the input system of the present invention.

FIG. 2 shows the input system for practically performing the method of the present invention. The input system of this invention mainly comprises hotkey's bootstrap codes 40, which is supposed to transfer a keyboard-identification means 50a to a keyboard 30 connected with a host computer 20 at the first time when the host computer 20 is booted to execute the hotkey's bootstrap codes 40. Taking a windowing-environment situated host computer 20 for instance, the hotkey's bootstrap codes 40 may be performed no sooner has the host computer 20 booted to execute Windows O/S by installing itself in a boot-directory folder of the Start menu of Microsoft Windows O/S or playing itself a TSR as an icon listed in the toolbar of Windows O/S. The keyboard 30 is supposed to response a keyboard-confirmation means 50b according to the keyboard-identification means 50a, in which the hotkey's bootstrap codes 40 will decide whether the keyboard-confirmation means 50b is correct or not; then boot the hotkey functions if active, or cease execution of the hotkey's bootstrap codes 40, otherwise. At the first time when the hotkey's bootstrap codes 40 is executed after booting of the host computer 20, the hotkey's bootstrap codes 40 would transfer a keyboard-identification means 50a to the keyboard 30, then, after receipt of the keyboard-identification means 50a, the firmware in the keyboard 30 will in turn transfer a keyboard-confirmation means 50b based on the keyboard-identification means 50a to the host computer 20 as a response to the hotkey's bootstrap codes 40. The menu of hotkey functions 60 is a menu to be shown on a computer's screen when a depressed single or combination key of the keyboard 30 is decided as a bootstrap hotkey 50c by the hotkey's bootstrap codes 40, in which the menu of hotkey functions 60 comprises at least an input-key indicating portion 60a and a corresponding application indicating portion 60b.

Figure 3:
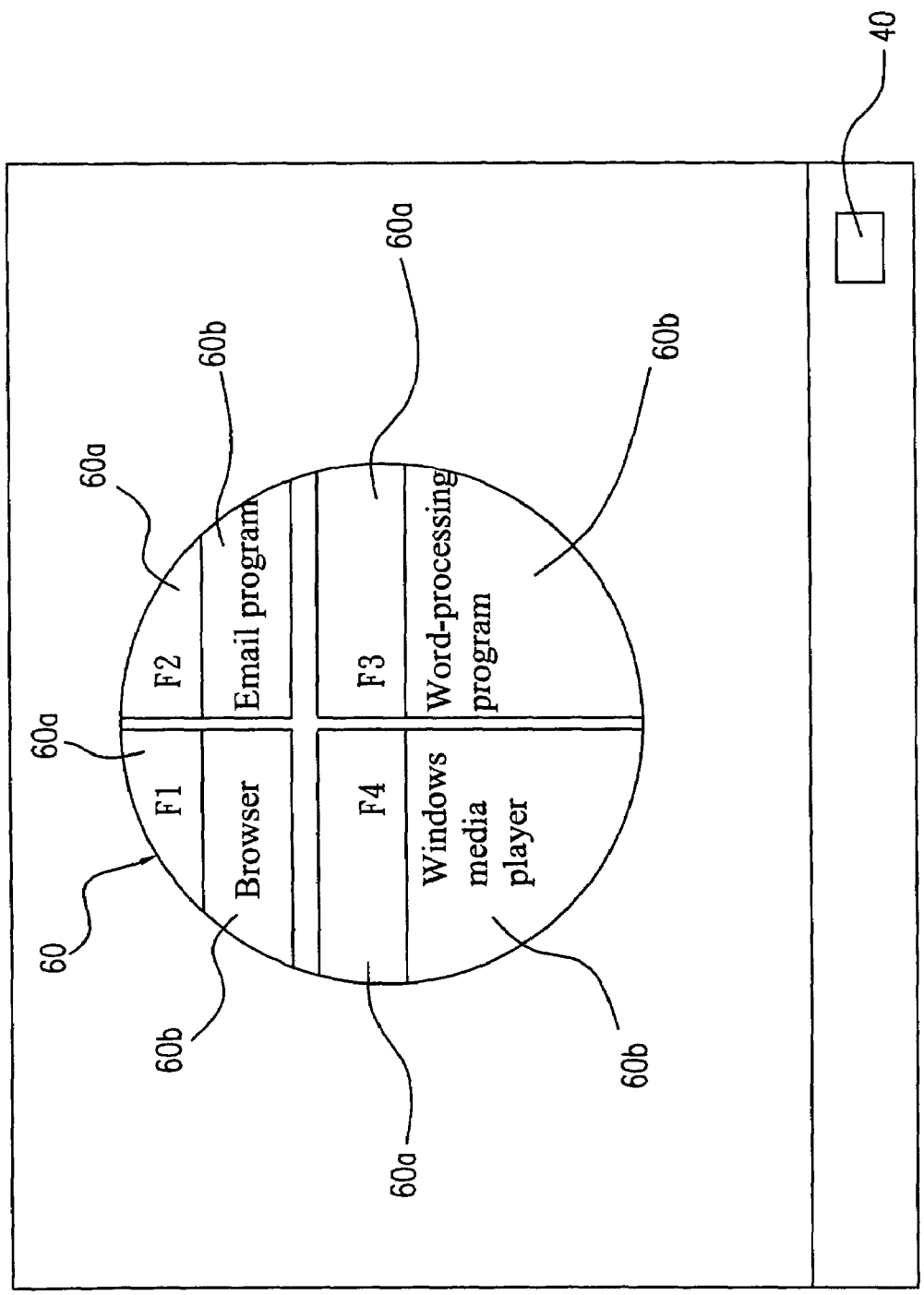
FIG. 3 is an illustration of the display frame of the present invention.

FIG. 3 shows the menu of hotkey functions of the present invention. The menu of hotkey functions 60 shown in FIG. 3 created by the hotkey bootstrap codes 40 when a correct bootstrap hotkey 50c is found is a practical example for explaining the input-key indicating portion 60a and the application indicating portion 60b. For instance, the input-key indicating portion 60a of hotkey F1 is corresponding with the application indicating portion 60b of Internet Explorer; the input-key indicating portion 60a of hotkey F2 is corresponding with the application indicating portion 60b of the email program of Outlook Express; the input-key indicating portion 60a of hotkey F3 is corresponding with the application indicating portion 60b of the word-processing program of Office word; the input-key indicating portion 60a of hotkey F4 is corresponding with the application indicating portion 60b of the Windows media player. Therefore, in the same manner, the host computer 20 will perform an application program of the application indicating portion 60b corresponding to the input-key indicating portion 60a when the hotkey's bootstrap codes 40 confirms that an input single or combination key of the keyboard 30 is identical to that indicated by the input-key indicating portion 60a.

The foregoing bootstrap hotkey 50c of this invention could be a default or user-defined bootstrap hotkey 50c. Similarly, the single or combination key indicated by the input-key indicating portion 60a could be a default or user-defined single or combination key, and also, the application program indicated by the application indicating portion 60b could be a default or user-defined application program. As to the technical measures for defining a bootstrap hotkey 50, a single or combination key indicated by the input-key indicating portion 60a, or an application program indicated by the application indicating portion 60b, all those things will be handled and processed by the hotkey's bootstrap codes 40.

The keyboard 30 matched with this invention could be a wired keyboard, a wireless keyboard, or a generic keyboard, any way, whatever a keyboard having its inside firmware capable of giving a correct keyboard-confirmation means 50b in response to a keyboard-identification means 50a of this invention.

Moreover, the hotkey's bootstrap codes 40 may be enclosed to the associated keyboard 30 of this invention in form of a CD (Compact Disk) or a FD (Floppy Disk), and of course, it may be updated at any time and made use for downloading from a web site of the Internet.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A method for constituting bootstrap hotkeys, comprising the steps of:
   identifying whether a keyboard is compatible, including the steps of:
   executing a host computer's hotkey bootstrap codes when said host computer is initially booted;
   transferring a keyboard-identification means from said host computer to a keyboard connected to said host computer; and
   transmitting a keyboard-confirmation means corresponding to said keyboard-identification means from said keyboard to said host computer;
   if the keyboard is identified as being compatible, then booting hotkey functions, wherein the step of booting hotkey functions includes the steps of:
   displaying on said host computer screen a menu of said hotkey functions including at least one input-key indicating portion and at least one application indicating portion corresponding to the input-key indicating portion when a depressed single key or combination key of said keyboard is recognized by said hotkey's bootstrap codes; and
   executing the application program associated with the application indicating portion corresponding to said input-key indicating portion when said depressed single key or combination key of said keyboard is identical to said input-key indicating portion indicated by the hotkey's bootstrap codes; and if the keyboard fails to be identified as compatible, then terminating said hotkey's bootstrap codes during said initial booting of said host computer.

2. The method according to claim 1, wherein said keyboard is a computer keyboard.

3. The method according to claim 1, wherein said keyboard is a wireless keyboard.

4. The method according to claim 1, wherein said hotkey is a default bootstrap hotkey.

5. The method according to claim 1, wherein said hotkey is a user-defined bootstrap hotkey.

6. The method according to claims 1, wherein said keyboard-identification means is a keyboard-identification instruction.

7. The method according to claim 1, wherein said keyboard-confirmation means is a keyboard-confirmation instruction.

8. The method according to claims 1, wherein said hotkey's bootstrap codes is obtained from the Internet.

9. The method according to claim 1, wherein said single key or said combination key indicated by said input-key indicating portion is a default single or a default combination key, respectively.

10. The method according to claim 1, wherein said application program indicated by said application indicating portion is a default application program.

11. The method according to claim 1, wherein said application program indicated by said application indicating portion is a user-defined application program.

12. An input system with bootstrap hotkeys, comprising:
   a host computer that executes a hotkey's bootstrap codes when said host computer is initially booted, wherein said hotkey's bootstrap codes transmits a keyboard-identification means to a keyboard connected to said host computer; whereby said keyboard transmits a keyboard-confirmation means corresponding to said keyboard-identification means during said initial booting, said hotkey's bootstrap codes further activates a hotkey function when said keyboard-comfirmation means is recognized by said hotkey's bootstrap codes as being compatible therewith and terminates said hotkey's bootstrap codes if said keyboard-confirmation means is not recognized by said hotkey's bootstrap codes as being compatible therewith; and
   a menu of hotkey functions to be displayed on said host computer's computer screen if a depressed single or combination key is recognized as a bootstrap hotkey by said hotkey's bootstrap codes, said menu comprising at least one input-key indicating portion and at least one corresponding application indicating portion; whereby, said host computer executes an indicated application program of said application indicating portion corresponding to said input-key indicating portion if said depressed single or combination key of said keyboard is determined by said hotkey's bootstrap codes to be identical to a corresponding code in said input-key indicating portion.

13. The input system according to claim 12, wherein said keyboard is a wired keyboard.

14. The input system according to claim 12, wherein said keyboard is a wireless keyboard.

15. The input system according to claim 12, wherein said bootstrap hotkey is a default bootstrap hotkey.

16. The input system according to claim 12, wherein said bootstrap hotkey is a user-defined bootstrap hotkey.

17. The input system according to claim 12, wherein said single or combination key indicated by said input-key indicating portion is a default single or combination key, respectively.

18. The input system according to claim 12, wherein said single or combination key indicated by said input-key indicating portion is a user-defined single or combination key, respectively.

19. The input system according to claim 12, wherein said application program indicated by said application indicating portion is a default application program.

20. The input system according to claim 12, wherein said application program indicated by said application indicating portion is a user-defined application program.

21. The input system according to claim 12, wherein said hotkey's bootstrap codes is made available for downloading from a web site of the Internet.

22. The input system according to claim 12, wherein said keyboard-identification means is a keyboard-confirmation instruction.

23. The input system according to claim 12, wherein said keyboard-confirmation means is a keyboard-confirmation instruction.

* * * * *